US012175874B2

(12) United States Patent
Schwindt

(10) Patent No.: US 12,175,874 B2
(45) Date of Patent: Dec. 24, 2024

(54) METHOD AND SYSTEM FOR UPDATING A FLIGHT PLAN

(71) Applicant: GE Aviation Systems Limited, Gloucestershire (GB)

(72) Inventor: Stefan Schwindt, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 318 days.

(21) Appl. No.: 17/718,821

(22) Filed: Apr. 12, 2022

(65) Prior Publication Data

US 2022/0343771 A1 Oct. 27, 2022

(30) Foreign Application Priority Data

Apr. 26, 2021 (EP) .................................... 21170563

(51) Int. Cl.
*G08G 5/00* (2006.01)

(52) U.S. Cl.
CPC ......... *G08G 5/0039* (2013.01); *G08G 5/0013* (2013.01); *G08G 5/0021* (2013.01); *G08G 5/0047* (2013.01)

(58) Field of Classification Search
CPC .. G08G 5/0039; G08G 5/0013; G08G 5/0021; G08G 5/0047; G08G 5/0095
See application file for complete search history.

(56) References Cited

U.S. PATENT DOCUMENTS

| | | | | | |
|---|---|---|---|---|---|
| 4,812,990 | A * | 3/1989 | Adams | G05D 1/0005 | 701/410 |
| 6,266,610 | B1 * | 7/2001 | Schultz | G06Q 10/047 | 701/533 |
| 6,314,362 | B1 * | 11/2001 | Erzberger | G08G 5/0043 | 340/961 |
| 6,334,344 | B1 * | 1/2002 | Bonhoure | G05D 1/101 | 244/190 |
| 6,424,889 | B1 * | 7/2002 | Bonhoure | G08G 5/006 | 701/13 |
| 6,529,821 | B2 * | 3/2003 | Tomasi | G01C 21/20 | 102/501 |

(Continued)

FOREIGN PATENT DOCUMENTS

| | | |
|---|---|---|
| CN | 110392415 A | 10/2019 |
| CN | 110992515 A | 4/2020 |
| CN | 111832776 A | 10/2020 |

*Primary Examiner* — Mussa A Shaawat
(74) *Attorney, Agent, or Firm* — McGarry Bair PC

(57) ABSTRACT

A method for updating a flight plan by an avionics device includes receiving a first flight plan comprising a first set of flight parameters having at least one fuel-related first flight parameter, receiving a second flight plan for a subsequent second flight, the second flight plan based on a fuel remaining in the aircraft without refueling subsequent to the first flight, and receiving an update to the first flight plan. The method further includes, determining, with the avionics device, a set of first updated flight parameters comprising at least one fuel-related first updated flight parameter, determining, whether the fuel-related first updated flight parameter will satisfy predetermined criteria of the second flight plan, and when the fuel-related first updated flight parameter will not satisfy the predetermined criteria, displaying a first notification onboard the aircraft, and receiving a selection of a refueling locations.

18 Claims, 5 Drawing Sheets

(56) References Cited

U.S. PATENT DOCUMENTS

| | | | | |
|---|---|---|---|---|
| 6,643,580 | B1 * | 11/2003 | Naimer | G08G 5/0086 340/963 |
| 7,194,353 | B1 * | 3/2007 | Baldwin | G08G 5/0039 701/528 |
| 9,529,356 | B2 | 12/2016 | Mere et al. | |
| 9,558,670 | B1 * | 1/2017 | Sheth | G08G 5/006 |
| 9,824,593 | B1 * | 11/2017 | Kronfeld | G01S 13/953 |
| 10,216,180 | B2 | 2/2019 | Mere et al. | |
| 10,345,824 | B2 | 7/2019 | Kim et al. | |
| 10,467,910 | B2 | 11/2019 | Small et al. | |
| 10,501,194 | B2 | 12/2019 | Knapp et al. | |
| 10,535,276 | B2 | 1/2020 | Schwindt | |
| 10,607,493 | B2 | 3/2020 | Schwartz et al. | |
| 10,777,085 | B2 | 9/2020 | Lax et al. | |
| 11,900,281 | B2 * | 2/2024 | de Oliveira | G08G 5/0043 |
| 2003/0023354 | A1 * | 1/2003 | Brust | G01C 23/005 701/18 |
| 2008/0288164 | A1 * | 11/2008 | Lewis | G08G 5/0034 701/120 |
| 2010/0030401 | A1 | 2/2010 | Rogers | |
| 2012/0191332 | A1 * | 7/2012 | Sawhill | G08G 5/0043 701/120 |
| 2017/0263137 | A1 | 9/2017 | Nostry | |
| 2018/0068569 | A1 * | 3/2018 | Chmelarova | G01C 21/20 |
| 2018/0189704 | A1 * | 7/2018 | Kumar | G08G 5/0034 |
| 2020/0143691 | A1 | 5/2020 | Sidiropoulos | |
| 2020/0160731 | A1 * | 5/2020 | De Villele | G08G 5/0052 |
| 2021/0103860 | A1 | 4/2021 | De Oliveira | |
| 2022/0130263 | A1 * | 4/2022 | Neis | G05D 1/101 |
| 2022/0139233 | A1 * | 5/2022 | Schwindt | G08G 5/0052 701/3 |
| 2022/0261012 | A1 * | 8/2022 | Ladurini | G05D 1/1062 |
| 2022/0415187 | A1 * | 12/2022 | Borgyos | G08G 5/0091 |

* cited by examiner

METHOD AND SYSTEM FOR UPDATING A FLIGHT PLAN

CROSS REFERENCE TO RELATED APPLICATION(S)

This application claims priority to, and benefit of, EP Patent Application No. 21170563.7 filed Apr. 26, 2021, which is incorporated herein in its entirety.

TECHNICAL FIELD

This disclosure relates generally to automatically updating a flight plan.

BACKGROUND

In an effort for airspace modernization, air traffic management is being modernized to leverage emerging technologies and aircraft navigation capabilities. Aircraft can exploit high accuracy provided by Global Navigation Satellite System (GNSS) or Global Positioning System (GPS)-based navigation systems, modern Flight Management Systems (FMSs) and Flight Control Systems (FCSs).

BRIEF DESCRIPTION

An aspect of the present disclosure relates to a method for updating a first flight plan having a first set of flight parameters, for an aircraft. The method receiving a first flight plan for a first flight comprising a first set of flight parameters having at least one fuel-related first flight parameter; receiving a second flight plan for a subsequent second flight, the second flight plan based on a fuel remaining in the aircraft without refueling subsequent to the first flight; and receiving an update to the first flight plan. The method also includes determining, based on the update to the first flight plan, a set of first updated flight parameters comprising at least one fuel-related first updated flight parameter; determining, whether the fuel-related first updated flight parameter will satisfy predetermined criteria of a second flight plan; and when the fuel-related first updated flight parameter will not satisfy the predetermined criteria, automatically displaying a first notification onboard the aircraft; and receiving a selection of a refueling location based on the notification.

In another aspect, the disclosure relates to a system for an aircraft. The system comprises an avionics device adapted to update a first flight plan, and configured to: store a first flight plan for a first flight comprising a first set of flight parameters having at least one fuel-related first flight parameter; store a second flight plan for a subsequent second flight, the second flight plan based on a fuel remaining in the aircraft without refueling subsequent to the first flight; receive an update to a first flight plan, the first flight plan comprising a first set of flight parameters having at least one fuel-related first flight parameter; determine, based on the update to the first flight plan, a set of first updated flight parameters comprising at least one fuel-related first updated flight parameter; determine, for a second flight plan, whether the fuel-related first updated flight parameter will satisfy predetermined criteria of the second flight plan; and when the fuel-related first updated flight parameter will not satisfy the predetermined criteria, automatically display a first notification onboard the aircraft; and receive a selection of a refueling location.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
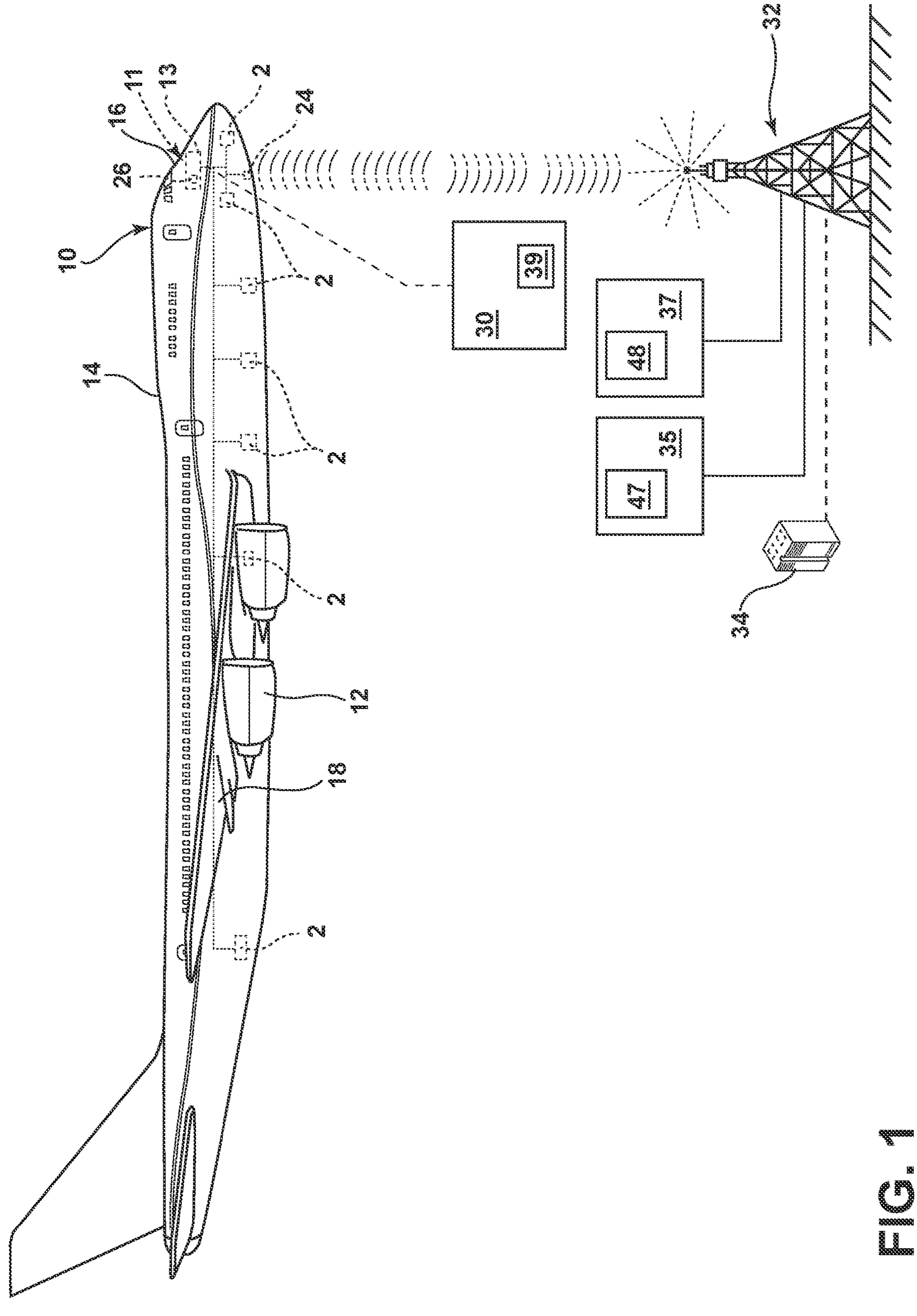
FIG. 1 is a schematic illustration of an aircraft and ground system according to aspects described herein.

Conventional aircraft typically employ flight plans prepared pre-flight. The flight plans typically include at least a planned route or flight path and many other parameters including fuel on board for a given flight of an aircraft. In some instances, changes or updates to a first flight plan can be made in-flight, which can affect the fuel availability for a subsequent flight. A conventional flight plan is a record or plan prepared by a pilot, a flight dispatcher, an air traffic controller, or any other aviation authority prior to an intended flight of an aircraft that provides important information about the flight. The flight plan can be saved to or otherwise received by the FMS prior to the intended flight. The aircraft can then be flown or operated according to the flight plan. Each flight plan can include a corresponding set of any number of flight parameters. As used herein, the term "flight parameters" can refer to discrete characteristics, factors, or conditions that can collectively define the flight plan. It will be understood that each flight parameter can comprise a respective value, measure, or other objective data. For example, a flight plan for a commercial aircraft for an airline can include a set of flight parameters that can comprise, without limitation, one or more of a departure or origin location, a destination, a trajectory, (such as a 3-dimensional or 4-dimensional trajectory), a type of flight (e.g., whether instrument flight rules (IFR) or visual flight rules (VFR)), an altitude, a flight level, an airspeed, a climb rate, a descent rate, a waypoint, a checkpoint, an alternate airport or destination, a turn radius, a fuel level, an airline, an airline flight number, an aircraft identification number, an aircraft type, a departure date, a departure or origin airport, a departure gate or jetway, a destination airport, an arrival gate or jetway, a departure time, an estimated time to complete the flight, an arrival time, the pilot's name, a number of passengers onboard, and combinations thereof.

One important factor for any flight plan is an indication of how much fuel is needed by the aircraft when flying from an origin airport to a destination airport. For example, a typical flight plan can include information indicative of the fuel on board (e.g., in hours and minutes of flight time), fuel usage for that flight, and an amount of reserve fuel. A minimum amount of fuel needed for a particular flight can be calculated or determined based at least in part on flight performance data provided by the manufacturer of the aircraft. A fuel burn rate can be determined based on specific throttle settings for climbing and cruising. Other factors such as the projected weather, altitude, aircraft weight, and fuel weight can also be used to estimate the necessary minimum amount of fuel to reach the planned destination for the particular flight.

The reserve fuel is fuel beyond a calculated minimum fuel needed to fly from the origin airport to the planned airport. The reserve fuel is intended to allow for unforeseen circumstances or for diversion to an alternate airport if the planned destination airport becomes unavailable. For example, reserve fuel can be burned when the calculated minimum fuel for the flight is insufficient due to an inaccurate weather forecast, air traffic control requiring an aircraft to fly at a lower-than-planned altitude, the addition of last-minute passengers whose weight was not accounted for when the flight plan was prepared, or any number of other unforeseen events.

A minimum required amount of reserve fuel can be determined based on predetermined rules. For example, reserve fuel under U.S. domestic operations conducted under Instrument Flight Rules can typically be determined based on having enough fuel to fly to the first point of intended landing, then fly to an alternate airport (if weather conditions require an alternate airport), then for 45 minutes thereafter at normal cruising speed. In other aspects, a required minimum amount of reserve fuel can be determined based on a predetermined percentage of flight time, such as 10 percent of the total flight time (i.e., a 10-hour flight needs enough reserve fuel to fly for another hour). In still other aspects, the required minimum amount of reserve fuel can be determined based on a predetermined percentage of fuel, such as 5 percent of the amount of fuel (i.e., a flight requiring 10,000 kg of fuel needs a reserve of 500 kg). The reserve fuel can be left over on the aircraft at the destination, or it can be consumed during flight (e.g., in the event of unforeseen flight conditions).

As used herein, the term "fuel-related flight parameter" can include any desired parameter related to fuel for an aircraft, such as one or more parameters indicative of, without limitation, any of a fuel on board, fuel burn rate, fuel capacity, fuel usage, fuel availability, reserve fuel, excess fuel, and combinations thereof with respect to a flight plan or any portion of a flight plan for an aircraft.

Flight plans also typically include one or more alternate destination airports that can be used in the event of an in-flight emergency. In some cases (e.g., for IFR flight plans) an alternate airport can be required, especially if inclement weather is forecast at the primary or planned destination. side).

Typically, respective flight plans are produced for multiple successive flights by a single aircraft (e.g., to be flown in a single day). For example, aircraft (particularly commercial aircraft) can fly multiple successive flights, referred to herein as "flight segments", per day. Each flight segment or successive flight can have a respective flight plan. In addition to the minimum required fuel (including reserve fuel) for a current flight segment, an aircraft intending to be flown on multiple successive flight segments will often carry extra fuel (i.e., more than is needed for the current flight segment). The extra fuel can be intended for use during one or more subsequent flight segments to thereby avoid a need to refuel the aircraft at the first destination airport prior to executing the second flight. The extra fuel can enable a pilot of an aircraft flying multiple successive flight segments to have more options to select refueling locations. This can be desirable, for example due to limited allotted turnaround times at a particular destination airport, or due to pilot or airline preferences in refueling locations (e.g., due to fuel prices at particular airports).

Changes to a particular flight plan can often be made in-flight (e.g. for weather avoidance), which can affect the flight plans for subsequent flight segments. For example, an in-flight change in a flight plan for a particular flight segment can cause the flight to re-route to an alternative airport. While the fuel consumption for the re-routed flight segment may be higher than originally planned, there should be sufficient fuel to allow the current flight to continue to the alternative airport. However, in such an instance, an unscheduled fuel uptake (i.e., a re-fueling of the aircraft sooner than originally planned) may be required in order to meet the minimum fuel and reserve fuel requirements to execute a subsequent flight plan for a subsequent flight segment, thereby affecting the subsequent flight schedules, and fuel cost estimates.

Similarly, if an equipment failure occurs in-flight, a maintenance action or equipment repair may be required (depending on the criticality of the equipment) prior to executing a subsequent flight plan for a subsequent flight segment. Further, in some cases, the equipment failure can cause a significant increase in the fuel usage for the particular flight. Additionally, the maintenance action or equipment repair may need to be requested and scheduled at the destination airport, which can affect the schedule for the subsequent flight segment. Likewise, depending on the time required to perform the maintenance action or equipment repair, prior to executing the subsequent flight plan, changes to the flight plan, schedule, and refueling locations for the subsequent flight segment may be needed.

In some cases, a flight plan can require an update or change in-flight due to environmental or operational conditions such as traffic, weather, mechanical issues, or the like. It will be appreciated that updates or changes to a flight plan can comprise or result in one or more changes to the corresponding set of flight parameters. The changes to the corresponding set of flight parameters can be calculated, predicted, estimated, or otherwise determined while in-flight.

Aspects of the present disclosure relate to methods and systems for updating or modifying at least a portion of a flight plan of a set of flight plans through an avionics device. In non-limiting aspects, the method can be performed while the aircraft is in-flight. In non-limiting aspects, the avionics device can comprise one or more of an FMS, a flight computer, or the like.

As used herein, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Furthermore, as used herein, the term "set" or a "set" of elements can be any number of elements.

As used herein, a "controller" or "controller module" can include a component configured or adapted to provide instruction, control, operation, or any form of communication for operable components to affect the operation thereof. A controller module can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like.

For example, the operation can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or greater than the second value, or being within a predetermined value range of the second value. It will be understood that such a determination may easily be altered to be satisfied by a positive/negative comparison or a true/false comparison. Example comparisons can include comparing a calculated value to a threshold value or threshold value range.

While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

The exemplary drawings are for purposes of illustration only and the dimensions, positions, order and relative sizes reflected in the drawings attached hereto can vary.

FIG. 1 is a schematic illustration of an aircraft 10 and a ground system, specifically an Air Traffic Controller (ATC) 32. The ATC 32 can include, or be communicatively coupled with, a second computing device such as a destination server 34, an air traffic control and monitoring system 35, an airline management system 37, or combinations thereof.

The aircraft 10 can include one or more propulsion engines 12 coupled to a fuselage 14. The propulsion engines 12 can require a fuel (not shown), such as aviation fuel, to operate. A cockpit 16 can be positioned in the fuselage 14 and wing assemblies 18 can extend outwardly from the fuselage 14. Further, a set of aircraft systems 2 that enable proper operation of the aircraft 10 can be included as well as one or more controllers or a computer 13, and a communication system having a communication link 24. While a commercial aircraft has been illustrated, it is contemplated the aircraft 10 can be any type of aircraft, for example, without limitation, fixed-wing, rotating-wing, personal aircraft, and the like.

The set of aircraft systems 2 can reside within the cockpit 16, within the electronics and equipment bay (not shown), or in other locations throughout the aircraft 10 including that they can be associated with the propulsion engines 12. Aircraft systems 2 can include but are not limited to an electrical system, an oxygen system, hydraulics or pneumatics system, a fuel system, a propulsion system, flight controls, audio/video systems, an Integrated Vehicle Health Management (IVHM) system, and systems associated with the mechanical structure of the aircraft 10.

The computer 13 can be operably coupled to the set of aircraft systems 2. The computer 13 can aid in operating the set of aircraft systems 2 and can receive information from the set of aircraft systems 2 and the communication link 24. The computer 13 can, among other things, automate the tasks of piloting and tracking the flight plan of the aircraft 10. The computer 13 can also be connected with other controllers or computers of the aircraft 10 such as, but not limited to, an avionics device or Flight Management System (FMS) (not shown). Any number of aircraft systems 2, such as sensors or the like, can be communicatively or operably coupled to the computer 13. The sensors can provide or receive information to or from the computer 13 based on the operation of the aircraft 10.

A communication link 24 can be communicably coupled to the computer 13 or other processors of the aircraft to transfer information to and from the aircraft 10. It is contemplated that the communication link 24 can be a wireless communication link and can be any variety of communication mechanisms capable of wirelessly linking with other systems and devices and can include, but are not limited to, satellite uplink, SATCOM internet, VHF Data Link (VDL), Aircraft Communications Addressing and Reporting System (ACARS network), Aeronautical Telecommunication Network (ATN), Automatic Dependent Surveillance-Broadcast (ADS-B), WiFi, WiMax, 3G wireless signal, Code Division Multiple Access (CDMA) wireless signal, Global System for Mobile Communication (GSM), 4G wireless signal, 5G wireless signal, Long Term Evolution (LTE) signal, focused energy (e.g., focused microwave, infrared, visible, or ultraviolet energy), or any combinations thereof. It will also be understood that the particular type or mode of wireless communication is not critical, and later-developed wireless networks are certainly contemplated. Further, the communication link 24 can be communicably coupled with the computer 13 through a wired link. Although only one communication link 24 has been illustrated, it is contemplated that the aircraft 10 can have multiple communication links communicably coupled with the computer 13. Such multiple communication links can provide the aircraft 10 with the ability to transfer information to or from the aircraft 10 in a variety of ways.

As illustrated, the computer 13 can communicate with an external source. Specifically, the computer 13 can communicate with ATC 32 via the communication link 24. In aspects, ATC 32 can be a ground facility, which can communicate directly with the FMS or any other avionics device communicatively coupled to the aircraft 10. In non-limiting aspects, ATC 32 can be any type of ATC 32 such as one operated by an Air Navigation Service Provider (ANSP). In non-limiting aspects, the air traffic control and monitoring system 35 and the airline management system 37 can communicate with the computer 13 via the ATC 32. The computer 13 can request and receive information from the designated ATC 32 or the designated ATC 32 can send a transmission to the aircraft 10. Although illustrated as ATC 32, it will be appreciated that the aircraft 10 can communicate with any suitable external source such as, but not limited to, an Air Operations Center (AOC), or the like.

The air traffic control and monitoring system 35 and the airline management system 37 can include a computer searchable first database 47 and a computer searchable second database 47, respectively. As illustrated, the computer 13 can also communicate with a first remote server 30, which can be located anywhere. The communication between the first remote server 30 and the computer 13 can be via an external data storage device 39. Non-limiting examples of the data storage device 39 can include, but is not limited to, hard drives, floppy disks, laptops, Universal Serial Bus (USB) drives, jump drives, mobile devices, CDs, storage arrays, or DVDs. Additionally, or alternatively, the first and second databases 47, 48 can be accessible by the computer 13, via the communication link 24. The computing 13 can run a set of executable instructions to access the first and second databases 47, 48, respectively and receive data therefrom.

The air traffic control and monitoring system 35 and the airline management system 37 can include respective general-purpose computing devices in the form of a computer, including a processing unit, a system memory, and a system bus, that communicatively couples various system components including the system memory to the processing unit. The system memory can include ROM and RAM. The computer can also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. It will be understood that the first and second databases 47, 48 can be any suitable database, including a single database having multiple sets of data, multiple discrete databases linked together, or even a simple table of data. It is contemplated that the databases 47, 48 can include respective sets of separate databases.

Any one or more of the destination server 34, air traffic control and monitoring system 35, an airline management system 37, or combinations thereof, can store a first set of fuel-related information 43 (e.g., in the first or second databases 47, 48, or both) accessible by the computer 13 via the communication link 24. In other non-limiting aspects, the first set of fuel-related information 43 can be predetermined and stored in the memory 26 of the computer 13. In non-limiting aspects, the first set of fuel-related information 43 can comprise any one or more of information related to fueling locations, fuel vendors or providers, fuel costs, re-fueling times, fuel ordering, and the like, for each airport of a set of airports. In other aspects, the set of fuel-related information can include any desired information related to fueling or re-fueling the aircraft 10 without departing from the scope of the disclosure.

Any one or more of the destination server 34, air traffic control and monitoring system 35, an airline management system 37, or combinations thereof, can store a set of aviation service related information 45 (e.g., in the first or second databases 47, 48, or both) accessible by the computer 13 via the communication link 24. In other non-limiting aspects, the set of aviation service-related information 45 can be predetermined and stored in the memory 26 of the computer 13. In non-limiting aspects, the set of aviation service-related information 45 can include any information related to aircraft repair and maintenance services available for the aircraft 10. For example, in non-limiting aspects, the aviation service-related information 45 can comprise without limitation, any one or more of information related to aviation service locations, aviation service vendors, aviation service costs, aviation service times, aviation service ordering, and the like, for each airport of a set of airports.

Figure 2:
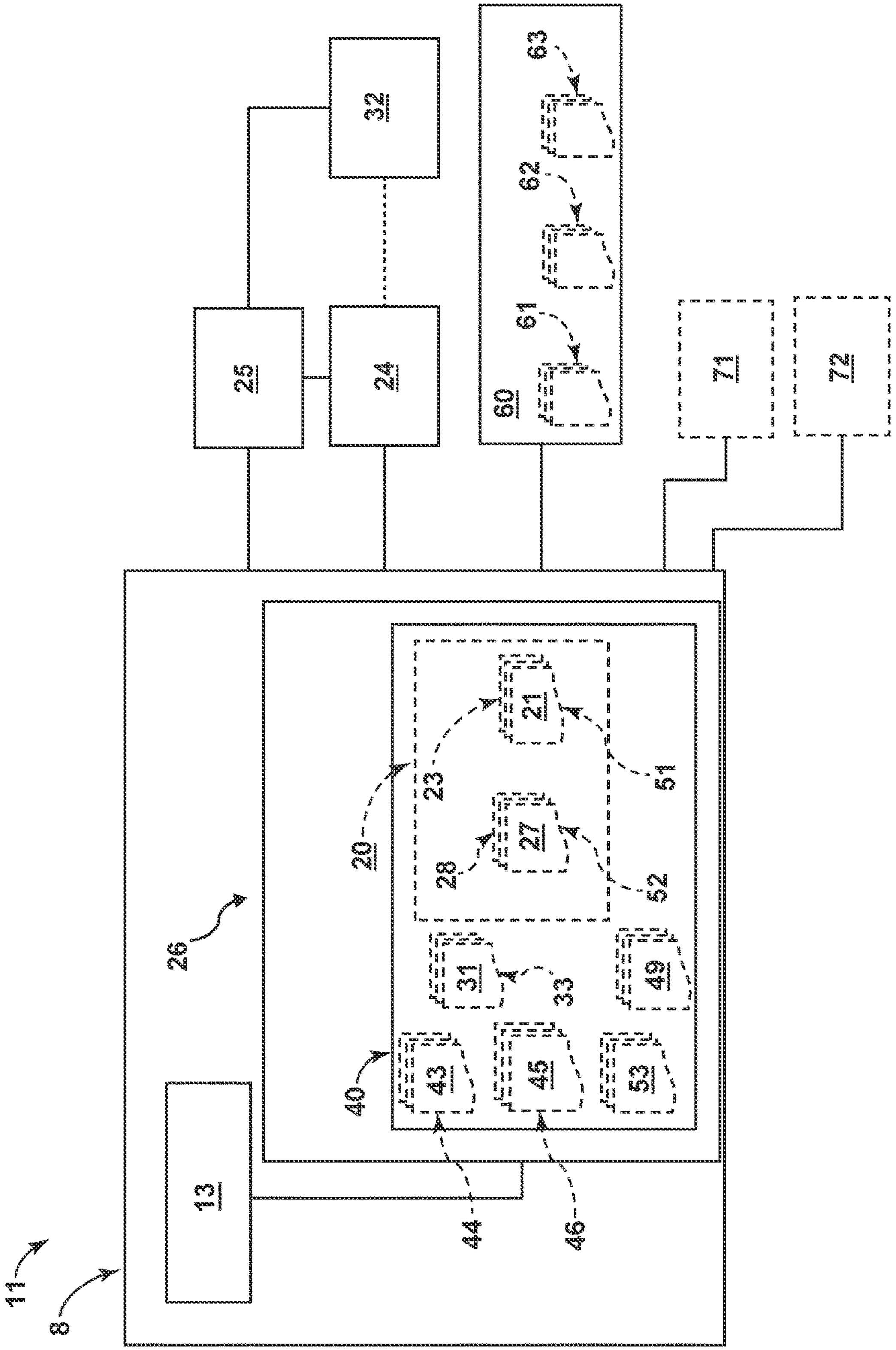
FIG. 2 is a block diagram of a system adapted to update a flight plan, according to aspects described herein.

FIG. 2 illustrates a non-limiting aspect of system 11 for updating a flight plan. The system 11 can include the computer 13. In some aspects the FMS 8 can be communicatively coupled with or form a portion of the computer 13. The FMS 8 can be communicatively coupled to the ATC 32 via the communication link 24. Although illustrated as the FMS 8 and ATC 32, it will be appreciated that the FMS 8 can be any suitable avionics device as described herein and ATC 32 can be any suitable external device as described herein. The computer 13 can comprise a memory 26 which can optionally include a searchable database 40.

The computer 13 can be communicatively coupled to a display device 60, (e.g., a user interface or monitor) arranged to provide information in visual or auditory format, or both, to the display device 60. In an aspect, the display device 60 can be located in the cockpit 16 of the aircraft 10. It is contemplated that the display device 60 can also obtain or receive input from the one or more users of the computer 13 (e.g., the pilot).

The computer 13 can include one or more processors, which can be running or executing any suitable programs. The computer 13 can include various components (not shown) as described herein. The computer 13 can include or be associated with any suitable number of individual microprocessors, power supplies, storage devices, interface cards, auto flight systems, flight management computers, and other standard components. The computer 13 can further include or cooperate with any number of software programs (e.g., flight management programs) or instructions designed to carry out the various methods, process tasks, calculations, and control/display functions necessary for operation of the aircraft 10. By way of non-limiting example, a navigation system including a GNSS receiver configured to provide data, such as the coordinates of the aircraft 10 can be coupled with the computer 13. Position estimates provided by the GNSS receiver can be replaced or augmented to enhance accuracy and stability by inputs from other sensors, such as inertial systems, camera and optical sensors, and Radio Frequency (RF) systems (none of which are shown for the sake of clarity). Such navigational data may be utilized by the FMS 8 for various functions, such as to navigate to a target position.

While not illustrated, it will be understood that any number of sensors or other systems can also be communicatively or operably coupled to the computer 13 to provide information thereto or receive information therefrom. By way of non-limiting example, a navigation system including the GNSS receiver configured to provide data that is typical of GPS systems, such as the coordinates of the aircraft 10, can be coupled with the computer 13. Position estimates provided by the GNSS receiver can be replaced or augmented to enhance accuracy and stability by inputs from other sensors, such as inertial systems, camera and optical sensors, and Radio Frequency (RF) systems (none of which are shown for the sake of clarity). Such navigation data may be utilized by the FMS 8 for various functions, such as to navigate to a target position.

The memory 26 can be RAM, ROM, flash memory, or one or more different types of portable electronic memory, such as discs, DVDs, CD-ROMs, etc., or any suitable combination of these types of memory.

It will be understood that the database 40 can be any suitable database, including a single database having multiple sets of data, multiple discrete databases linked together, or even a simple table of data. It is contemplated that the database 40 can incorporate a number of databases or that the database can actually be a number of separate databases. In a non-limiting aspect, the database 40 can be a conventional Navigation Database (NDB). The database 40 can contain information including, but not limited to, airports, runways, airways, waypoints, navigational aids, airline/company-specific routes, and procedures such as Standard Instrument Departure (SID), and Standard Terminal Approach Routes (STAR).

The memory 26 can store a set of flight plans 20 in the database 40. The set of flight plans 20 can include a first flight plan 21 having a set of first flight parameters 23, and a second flight plan 31 having a set of second flight parameters 33 intended to be executed (i.e., on a second flight) subsequent to the first flight plan 21. The second flight plan 31 can be based in part on a determined or estimated fuel remaining in the aircraft without refueling subsequent to the execution of the first flight plan 21. The second flight plan 31 can also comprise predetermined criteria 53 to execute the second flight plan 31. As illustrated, in non-limiting aspects, the first set of fuel-related information 43 and the set of aviation-service related information 45 can also be stored in the memory 26. In non-limiting aspects, the second flight plan 31 can be scheduled or otherwise intended to be executed on a second flight that is immediately subsequent (i.e., with no intervening flights) to the first flight plan 21. As used herein, an "immediately subsequent" flight can refer to a flight that follows the first flight with no intervening flights, regardless of the time duration between the flights. In other non-limiting aspects, the second flight plan 31 can be intended or scheduled to be executed on a second flight that is not immediately subsequent (i.e., having one or more intervening flights) to the first flight plan 21.

In aspects, the first flight plan 21 and the second flight plan 31 can be provided to the FMS 8 at the same time, or at different times. In various aspects, the flight plans of the set of flight plans 20 can be provided to the FMS 8 from the same or different sources. For example, the first flight plan 21 or the second flight plan 31 or both can be provided, entered or otherwise loaded by the pilot or flight crew into the FMS 8. Alternatively, the first flight plan 21 or the second flight plan 31, or both, can be supplied to the aircraft 10 via the communication link 24 from ATC 32 or any other suitable external source. Additionally, or alternatively, the first flight plan 21 or the second flight plan 31, or both can be supplied to the FMS 8 via an Electronic Flight Bag (EFB) 25. The EFB 25 can be communicatively coupled to ATC 32 and the communication link 24 (for example, via an Aircraft Interface Device (AID), such that the first flight plan 21, can be received by or contained within the EFB 25. The EFB 25 can then subsequently upload the first flight plan 21 to the FMS 8 via the communication link 24. The EFB 25 can include a controller module, which can be configured to automatically perform the calculations, determinations, and executions, of the FMS 8. The controller module can be configured to run any suitable programs or executable instructions designed to carry out various methods, functionality, processing tasks, calculations, or the like, to enable or achieve the technical operations or operations described herein. As such, it will be understood that the various operations described herein of updating the first flight plan 21 can be done through or via the avionics device, specifically the FMS 8. As used herein, the phrase "via the avionics device" can be defined as processing or other suitable operations done within the avionics device through the components of the avionics device, or the phrase can alternatively refer to the processing and other suitable operations done external to the avionics device in which the avionics device delegated or solicited the external device to perform these operations. The external device can include, for example, the EFB 25. During flight, the current or first flight plan 21 for the aircraft 10 can be executed under the direction of the FMS 8 (for example, using Flight Director indications to pilot, or Autopilot command).

In non-limiting aspects, the set of first flight parameters 23 can include a fuel-related first flight parameter 51. For example, in non-limiting aspects, the fuel-related first flight parameter 51 can include one or more parameters indicative of, without limitation, any of a first fuel on board, first fuel usage, first fuel availability, first reserve fuel, first excess fuel, first remaining fuel, and combinations thereof for the first flight. In other aspects, the fuel-related first flight parameter 51 can include any desired parameter related to fuel for the aircraft 10.

As described in more detail herein, a modification, amendment, change, or first update 27 to at least a portion of the first flight plan 21 can also be provided to the FMS 8, and stored in the memory 26.

The first update 27 can be provided to the FMS 8 while the first flight plan is being executed (i.e., in-flight). In various aspects, the first update 27 can be provided to the FMS 8 from any authorized source. The first update 27 can be manually entered. For example, the first update 27 can be manually entered (e.g., by a pilot on a Multi-Function Control Display Unit (MCDU) or Multi-purpose Control Display of the FMS 8. Alternatively, or additionally, the first update 27 can be provided by an external source to the FMS 8, such as, without limitation, an ATC 32, AOC, ACARS, EFB 25, or any combination thereof. For example, the first update 27 can be supplied to the aircraft 10 via the communication link 24 from ATC 32. In other non-limiting aspects, the first update 27 can be supplied to the FMS 8 via the EFB 25. The first update 27 can be received by or contained within the EFB 25. The EFB 25 can then subsequently upload the first update 27 to the FMS 8 via the communication link 24. In still other aspects, the FMS 8 can autonomously calculate or determine the first update 27.

The first update 27 can comprise a set of first updated flight parameters 28. Regardless of the source of the first update 27, in non-limiting aspects, the FMS 8 can generate, estimate, or otherwise determine the set of first updated flight parameters 28 based on the first update 27.

One or more of the first updated flight parameters 28 can correspond to a respective first flight parameter 23. The first update 27 can result in or necessitate a change to the respective value of any number of the first flight parameters 23. That is, based on the first update 27, the set of first updated flight parameters 28 can comprise one or more new, modified, amended, changed or updated values for one or more corresponding flight parameters of the set of first flight parameters 23. The changes to the values of the first flight parameters 23 can include or necessitate a change to the value of a fuel-related first flight parameter 51 to define a fuel-related first updated flight parameter 52.

For example, in non-limiting aspects, the set of first updated flight parameters 28 can include or result in a fuel-related first updated flight parameter 52 that corresponds to the fuel-related first flight parameter 51. In non-limiting aspects, the fuel-related first updated flight parameter 52 can include one or more parameters indicative of, without limitation, any of a first updated fuel on board, first updated fuel usage, first updated fuel availability, first updated reserve fuel, first updated excess fuel, and combinations thereof) for the first flight. In non-limiting aspects, the fuel-related first updated flight parameter 52 can comprise a value that is different from the value of the corresponding fuel-related first flight parameter 51.

For example, based on a particular set of first updated flight parameters 28, the FMS 8 can determine a change or update to a particular fuel-related parameter, such as fuel quantity on board at the end of the flight, that results in or defines a respective fuel-related first updated flight parameter 52 (e.g., an updated fuel quantity on board at the end of the flight) that is less than a corresponding fuel-related first flight parameter 51. For example, in non-limiting aspects, the FMS 8 can be configured to predict or calculate a fuel quantity on board the aircraft 10 (i.e., a fuel availability) at the end of the first flight, based on completing the first flight in accordance with the set of first updated flight parameters 28, the first flight parameters 23, or a combination thereof, to determine or define a predicted fuel quantity on board at the end of the first flight that is available for use on a second flight). Based on the predicted fuel on board the aircraft 10 at the end of the first flight, a fuel availability (e.g., a fuel quantity on board) for the aircraft can be determined for the second flight. In non-limiting aspects the fuel availability for the second flight can be based on a fuel quantity determined to be remaining in the aircraft without refueling the aircraft subsequent to the first flight. In some cases. the fuel-related first updated flight parameter 52 can result in a determined need to re-fuel the aircraft 10 sooner, or re-fuel at a different re-fueling location (e.g., the first destination location), than previously planned, or both, prior to executing the second flight plan 31.

As will be discussed in more detail herein, in some instances, the first update 27 to the first flight plan 21 can be necessitated, or accompanied by, an identified need for a repair to, or maintenance of, equipment onboard the aircraft 10 that is determined or identified during execution of the first flight plan 21. Further, in some instances, depending on the aircraft 10 or other factors, a maintenance or repair action will need to be completed to obtain clearance, to execute the second flight plan 31. In non-limiting aspects, the determination of a need for a repair to, or maintenance of, equipment onboard the aircraft 10 can be made in-flight (i.e., during execution of the first flight plan 21.

In non-limiting aspects, the FMS 8 can be further configured to determine whether the fuel-related first updated flight parameter 52 will satisfy predetermined criteria 53 of the second flight plan, (e.g., enable the aircraft 10 to meet the predetermined criteria 53 to execute the second flight plan 31. For example, in non-limiting aspects, the predetermined criteria 53 of the second flight plan 31 can include having sufficient fuel onboard the aircraft 10 at the completion of the first flight plan 21 prior to a refueling to execute the second flight plan 31. In other non-limiting aspects, the predetermined criteria 53 of the second flight plan 31 can include having a predetermined minimum amount of fuel on board the aircraft 10 at the start of the second flight without refueling prior to the second flight. In still other non-limiting aspects, the predetermined criteria 53 of the second flight plan 31 can include having a fuel-related first updated flight parameter 52 comprising a value that is within a predetermined amount or percentage of the fuel-related first parameter 51 at the start of the second flight without refueling prior to the second flight. Other aspects are not so limited, and it is contemplated that the predetermined criteria 53 of the second flight plan 31 can comprise any desired fuel-related criteria with respect to the second flight plan 31, without departing from the scope of the disclosure.

In non-limiting aspects, the FMS 8 can be further configured to, in the event that the fuel-related first updated flight parameter 52 is determined to not satisfy predetermined criteria 53 of the second flight plan 31, notify the pilot or flight crew of the determination. For example, in non-limiting aspects, in the event that the FMS 8 determines while executing a particular first flight plan 21 that the that the fuel-related first updated flight parameter 52 (e.g. predicted fuel availability) does not satisfy a predetermined criteria 53 of the second flight plan 31, the FMS 8 can provide a first signal to cause the display device 60 to show or display a first notification 61 (for example, an alert) on the display device 60. The first notification 61 can indicate to the pilot or flight crew that, with respect to the first update 27, the fuel-related first updated flight parameter 52 does not satisfy predetermined criteria 53 of the second flight plan 31 or will not enable the aircraft 10 to meet the predetermined criteria 53 to execute the second flight plan 31.

The FMS 8 can be further configured to, in the event that the fuel-related first updated flight parameter 52 is determined to not satisfy predetermined criteria 53 of the second flight plan 31, determine a second set of fuel-related information 49. For example, in non-limiting aspects, the second set of fuel-related information 49 can include, a determined quantity of fuel needed to enable the aircraft 10 to meet the predetermined criteria 53 of the second flight plan 31, and a set of refueling locations 44. In other non-limiting aspects, the second set of fuel-related information 49 can comprise any desired additional information without departing from the scope of the disclosure. In non-limiting aspects, the second set of fuel-related information 49 can be determined based at least in part on the first set of fuel-related information 43.

In non-limiting aspects, the second set of fuel-related information 49 can additionally or alternatively be based on a set of predetermined rules or preferences. For example, the set of refueling locations 44 can be determined based on a proximity to a destination airport or a proximity to a current location of the aircraft 10. In other aspects, the set of predetermined rules can include any desired rule or preference without departing from the scope of the disclosure. In non-limiting aspects, the second set of fuel-related information 49 can comprise any one or more of determined or calculated information related to fueling locations, fuel vendors, fuel quantities, fuel weights, fuel costs, re-fueling times, distance from the first destination, distance from the second departure location, distance from a current location of the aircraft 10, and the like, for each airport of a set of airports. In other aspects, the second set of fuel-related information 49 is not so limited, and the second set of fuel-related information 49 can comprise any desired fuel-related information without departing from the scope of the disclosure.

The FMS 8 can be configured to notify the pilot or flight crew of the determined refueling locations 44. For example, in non-limiting aspects, the first notification 61 can include a list, or other indication, of the set of refueling locations 44. In some aspects, the first notification 61 can include a dynamic display on the display device 60 to enable the pilot to iterate through a list such as a linked list or selectable menu of the set of refueling locations 44.

In non-limiting aspects, the first notification 61 can comprise other information related to the refueling locations 44. For example, in non-limiting aspects, the FMS 8 can be further configured to determine, based on the first set of fuel-related information 43, or the second set of fuel-related information 49, or both, at least one of a respective fuel cost (e.g., a monetary cost) and a respective estimated time to refuel at each determined refueling location 44. In such aspects, the first notification 61 can further include the respective fuel cost or respective estimated time to refuel, or both, with respect to the determined refueling locations 44. In other non-limiting aspects, the first notification 61, can comprise any other desired information related to the refueling locations 44 without departing from the disclosure. For example, in other non-limiting aspects, the FMS 8 can be configured to calculate or estimate a respective potential time of arrival of the aircraft 10 at one or more of the determined refueling locations 44. In such aspects, the first notification 61 can further include the respective potential time of arrival by the aircraft 10 to the determined refueling locations 44.

In some aspects, the first set of fuel-related information 43 can further include preferences or weighting factors for at least a subset of the first set of fuel-related information 43. For example, a predetermined weighting factor can be applied by the FMS 8 to favor refueling locations having a lower cost of fuel, or a faster re-fueling time. The preferences or weighting factors can be applied by the FMS 8 to determine a relative ranking of the determined refueling locations 44. In such aspects, the first notification 61 can further comprise a relative ranking of the determined refueling locations 44.

In non-limiting aspects, the first notification 61 can comprise still other information related to the refueling locations 44, such as fuel vendor names, fuel service provider names, fuel costs at each refueling location 44, re-fueling times at each refueling location 44, distance of each respective refueling location 44 from the first destination, distance of each respective refueling location 44 from the second departure location, predetermined preferred fuel vendors, fuel ordering information for each refueling location 44, and the like. In other aspects, the first notification 61 is not so limited, and the first notification 61 can comprise any desired fuel-related information without departing from the scope of the disclosure.

It is contemplated that in non-limiting aspects, the first notification 61 can include a prompt to the user (e.g., the pilot) to choose or select (e.g., input into the computer 13 or FMS 8) a particular refueling location 44 of the refueling locations 44. In response to a selection, by the user, of a particular refueling location 44 of the determined refueling locations 44, the FMS 8 can be further configured to automatically triggering a first message 71 to a predetermined recipient associated with the selected refueling locations 44. at one of the refueling locations to request a fuel service. For example, the first message 71 can be sent via the communication link 24 and the ATC 32 to the selected refueling location 44 to request of reserve a refueling service or transaction for the aircraft 10. In some aspects, the first message 71 can include a requested quantity of fuel and an estimated time of arrival of the aircraft 10 at the selected refueling location 44 for refueling. The aircraft 10 can then be navigated to the selected refueling location 44, and the aircraft 10 can be refueled at the selected refueling location 44 prior to executing the second flight plan 31.

It is contemplated that, in non-limiting aspects, the first update 27 to the first flight plan 21 can be necessitated or accompanied by a need for a repair to, or maintenance of, equipment on-board the aircraft 10. Regardless of the determination by the FMS 8 whether the fuel-related first updated flight parameter 52 will enable the aircraft 10 to meet the predetermined criteria 53 of the second flight plan 31, the FMS 8 can optionally be configured to additionally or alternatively determine whether the first update 27 to the first flight plan 21 is necessitated or accompanied by an identified need for an aviation service action to the aircraft 10 that must be performed prior to executing the second flight plan 31. For example, the aviation service action can include a repair to, maintenance, replacement, or inspection of, equipment onboard the aircraft 10. An indication of the need for an aviation service action can be manually entered into the FMS 8 (e.g., by a pilot), or automatically provided by the computer 13 or otherwise indicated by an external source (e.g. EFB 25, or the ATC 32). In non-limiting aspects the FMS 8 can be configured to determine, based on the indicated need for an aviation service action, whether the needed aviation service is required to be performed prior to executing the second flight plan 31. For example, in some aspects, the FMS 8 can be configured to determine whether the needed aviation service would result in an inability to dispatch (e.g., receive a "no go" indication for a subsequent take-off, unless the aviation service is completed) after landing or otherwise ending the first flight plan 21. In aspects, such a determination can be based on predetermined rules, such as conventional minimum equipment list (MEL) rules. For example, in non-limiting aspects, the FMS 8 can be configured to determine that an indicated need for service to equipment onboard the aircraft 10 would result in an inability to dispatch on a subsequent flight plan 31, based on a predetermined MEL for the aircraft 10. Regardless of the reason or basis of the determination of the need for aviation service, in the event the FMS 8 determines the need for the aviation service to be performed prior to executing the second flight plan 31, the FMS 8 can be configured to further determine additional information, such as a set of aviation service locations 46.

In non-limiting aspects, the aviation service related information 45 can comprise any one or more of predetermined information related to aviation service locations, aviation service vendors, aviation service costs, aviation service times, distance of the aviation service locations from the first destination, distance of the aviation service locations from the second departure location, predetermined aviation service providers, parts availability, parts costs, and the like, for each airport of a set of airports. In other aspects, the aviation service related information 45 is not so limited, and the aviation service related information 45 can comprise any desired aviation service related information without departing from the scope of the disclosure. In the event that such a need for an aviation service action is determined, the FMS 8 can be further configured to notify the pilot or flight crew of the determination. For example, in non-limiting aspects, the FMS 8 can provide a second signal to cause the display device 60 to show or display a second notification 62 on the display device 60 (e.g., in the cockpit 16). The second notification 62 can include information indicative of the need for an aviation service action to the aircraft 10 that must be performed prior to executing the second flight plan 31.

In non-limiting aspects, in the event that the FMS 8 additionally or alternatively determines the first update 27 to the first flight plan 21 is necessitated or accompanied by a need for an aviation service action to the aircraft 10 that must be performed prior to executing the second flight plan 3, the FMS 8 can be further configured to determine additional information such as a set of aviation service locations 46.

The FMS 8 can also be configured to notify the pilot or flight crew of the determined set of aviation service locations 46. For example, in non-limiting aspects, the second notification 62 can include a list, or other indication, of the set of aviation service locations 46. In some aspects, the second notification 62 on the display device 60 can include a dynamic display to enable the pilot to iterate through a list, such as a linked list or selectable menu, of the set of aviation service locations 46. In some aspects, the set of aviation service locations 46 can comprise a predetermined list of aviation service locations 46. In other aspects, the set of aviation service locations 46 can be determined based on other predetermined information. For example, in some aspects the set of aviation service locations 46 can be determined based on, without limitation, predetermined aviation service costs, aviation servicing times, availability of service parts, estimated aviation servicing times, a distance from the first destination, a distance from the second departure location, a distance from the current location of the aircraft 10, and combinations thereof, for each respective aviation service location 46. In still other aspects, the set of aviation service locations 46 can be determined based on any desired criterion or preference.

In non-limiting aspects, the second notification 62 can comprise other information related to the aviation service locations 46. For example, in non-limiting aspects, the FMS 8 can be further configured to determine, based on the aviation service-related information 45, at least one of a respective service cost (e.g. a monetary cost) and a respective estimated time to complete the service at each determined aviation service location 46. In such aspects, the second notification 62 can further include the respective service cost or respective estimated time to complete the aviation service, or both, with respect to the respective aviation service locations 46.

In other non-limiting aspects, the FMS 8 can be configured to calculate a respective time of arrival at one or more of the determined aviation service locations 46. In such aspects, the second notification 62 can further include the respective time of arrival by the aircraft 10 to the determined aviation service locations 46.

In some aspects, the aviation service-related information 45 can further include preferences or weighting factors for at least a subset of the aviation service-related information 45. For example, a predetermined weighting factor can be applied by the FMS 8 to favor aviation service 46 locations having a lower cost for the needed aviation service, or a faster servicing time. The preferences or weighting factors can be applied by the FMS 8 to determine a relative ranking of the determined aviation service locations 46. In such aspects, the second notification 62 can further comprise a relative ranking of the determined aviation service locations 46.

In non-limiting aspects, the second notification 62 can comprise still other information related to the aviation service locations 46, such as aviation service vendor names, aviation service costs at each respective aviation service location 46, servicing times at each aviation service location 46, distance of each respective aviation service location 46 from the first destination, distance of each respective aviation service location 46 from the second departure location, distance of each respective aviation service location 46 from the current location of the aircraft 10, predetermined preferred aviation service vendors, aviation service ordering information for each aviation service location 46, and the like. In other aspects, the second notification 62 is not so limited, and the second notification 62 can comprise any desired aviation service related information without departing from the scope of the disclosure.

The FMS 8 can be further configured to determine, based on the aviation service related information 45, at least one of a respective service cost (e.g. a monetary cost) and a respective estimated time to complete the maintenance or repair service at each determined aviation service location 46. In such aspects, the second notification 62 can further include the respective aviation service cost or respective estimated time to complete the aviation service action, or both, with respect to the determined aviation service locations 46.

It is contemplated that in non-limiting aspects, the second notification 62 can include a prompt to the user (e.g., the pilot) to choose or select (e.g., input into the computer 13 or FMS 8) a particular selected aviation service location 46 of the aviation service locations 46. In response to a selection by a user of a selected aviation service location 46 of the aviation service locations 46, the FMS 8 can be further configured to automatically trigger a second message 72 to a predetermined recipient associated with the selected aviation service location 46 to request an aviation service action. For example, the second message 72 can be sent via the communication link 24 and the ATC 32 to the selected aviation service location 46 to request or reserve an aviation service action or transaction for the aircraft 10. In some aspects, the second message 72 can include a requested aviation service action and an estimated time of arrival at the selected aviation service location 46 by the aircraft 10.

The FMS 8 can be further configured to, in the event that the fuel-related first updated flight parameter 52 is determined to not satisfy predetermined criteria 53 of the second flight plan 3131, notify the pilot or flight crew of the determination. For example, in non-limiting aspects, in the event that the FMS 8 determines that, based on the fuel-related first updated flight parameter 52, the aircraft 10 will satisfy predetermined criteria 53 of the second flight plan 31, the FMS 8 can provide a third signal to cause the display device 60 to show or display a third notification 63. The third notification 63 can indicate to the pilot or flight crew that, with respect to the first update 27, the fuel-related first updated flight parameter 52 will satisfy predetermined criteria 53 of the second flight plan 31 or enable the aircraft 10 to meet predetermined criteria 53 to execute the second flight plan 31.

Figure 3:
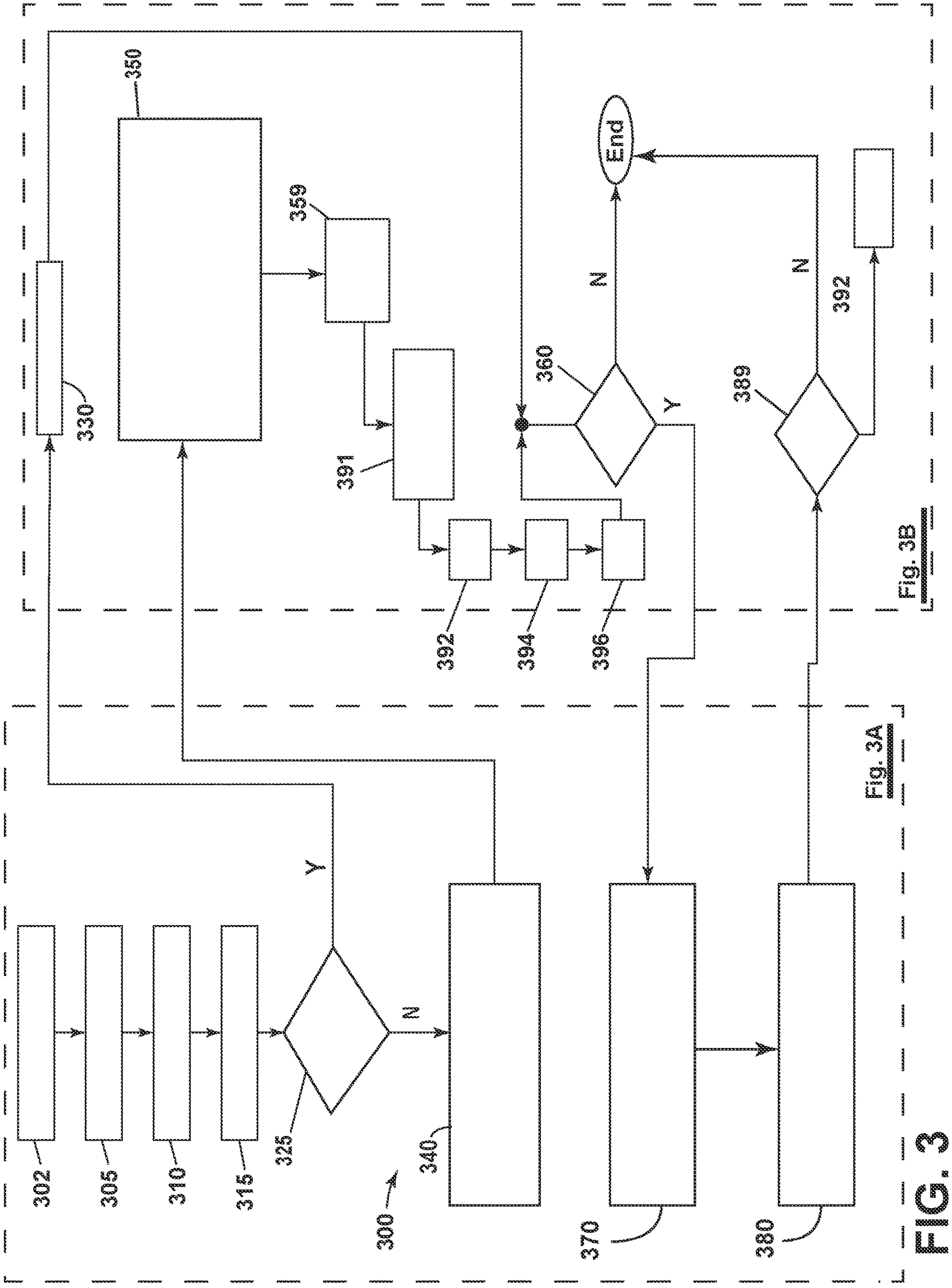
FIG. 3 is a flow chart diagram illustrating an overview of a method of updating a flight plan, according to aspects described herein, and further detailed in FIGS. 3A and 3B.
Figure 3A:
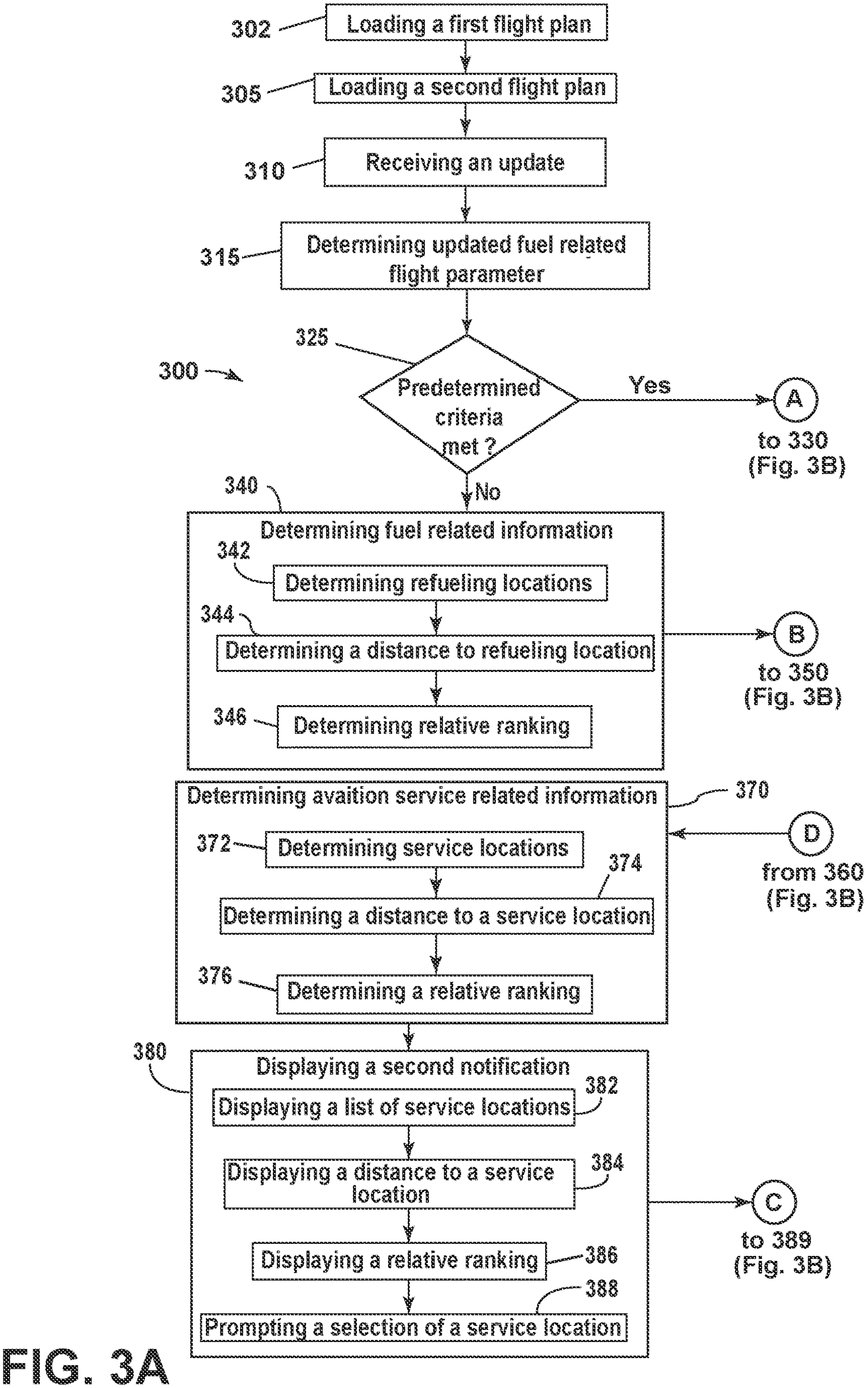
FIGS. 3A and 3B collectively form FIG. 3 as shown.
Figure 3B:
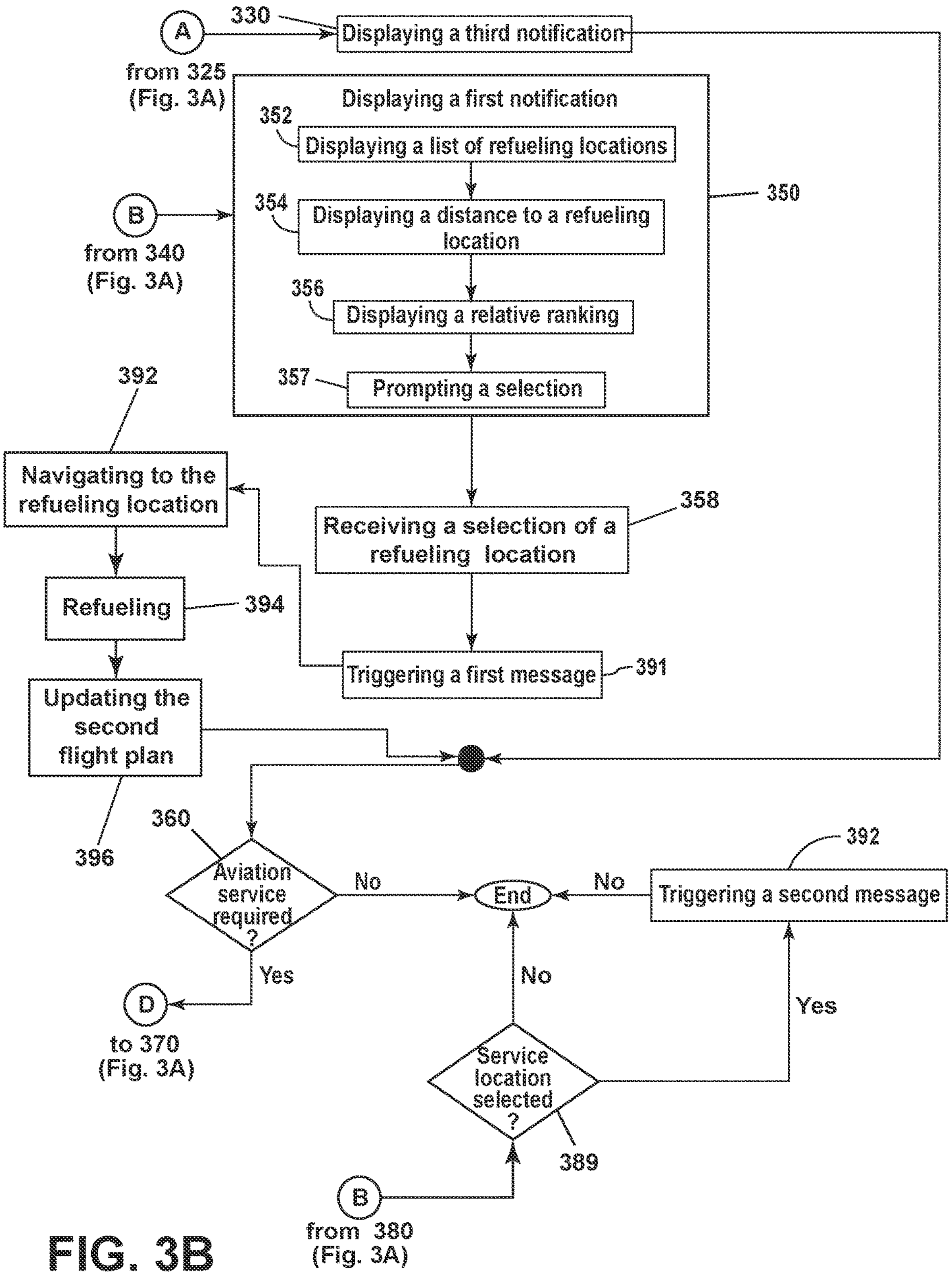

FIGS. 3, 3A, and 3B collectively illustrate a non-limiting example of a method 300 of updating the first flight plan 21 of a set of flight plans 20 for an aircraft 10 for example, using the system of FIG. 2. The method 300 can be performed while the aircraft 10 is in-flight (i.e., executing the first flight plan 21). Although described in terms of the FMS 8, it will be appreciated that the method 300 can be applied to any suitable avionics device.

In non-limiting aspects, the method 300 can begin by loading, or storing, into an avionics device, such as the FMS 8, the first flight plan 21 for a first flight comprising a set of first flight parameters 23 having at least one fuel-related first flight parameter 51, at 302, and loading, or storing, into the FMS 8, a second flight plan 31 for a subsequent second flight at 305. The second flight plan 31 can be based on a determined or estimated quantity of fuel remaining in the aircraft without refueling subsequent to the first flight. The method 300 can include receiving with the FMS 8, a first update 27 (e.g., a change or modification) to at least a portion of the first flight plan 21, at 310.

In various aspects, the first update 21 can be provided to the FMS 8 from any authorized source. For example, the first update 27 to the first flight plan 21 can be manually entered (e.g., by a pilot on a Multi-Function Control Display Unit (MCDU) or Multi-purpose Control Display of the FMS 8) In non-limiting aspects, the first update 27 can be received from any other authorized source such as, but not limited to an ATC 32, an EFB 25, an Aircraft Communications Addressing and Reporting System (ACARS), an Airline Operations Center (AOC) or any combination thereof.

Regardless of the source of the first update 27, the method 300 can include, at 315, determining with the FMS 8, based on the update, a set of first updated flight parameters 28. For example, the FMS 8 can autonomously generate, estimate, or otherwise determine the set of first updated flight parameters 28 based on the first update 27 to the first flight plan 21. In non-limiting aspects, the set of first updated flight parameters 28 can include information indicative of a fuel-related first updated flight parameter 52 for the first flight.

The method 300 can include at 325, determining, with the FMS 8, whether the fuel-related first updated flight parameter 52 will satisfy predetermined criteria 53 of the second flight plan 31. For example, in non-limiting aspects, the predetermined criteria 53 of the second flight plan 31 can include having sufficient fuel to execute the second flight plan 31. In other non-limiting aspects, the predetermined criteria 53 of the second flight plan 31 can include having a predetermined minimum amount of fuel on board the aircraft 10 at the start of the second flight. In still other non-limiting aspects, the predetermined criteria 53 of the second flight plan 31 can include having a fuel-related first updated flight parameter 52 comprising a value that is within a predetermined amount or percentage of the value of the fuel-related first flight parameter 51. Other aspects are not so limited, and it is contemplated that the predetermined criteria 53 of the second flight plan 31 can comprise any desired fuel-related criteria to execute the second flight plan 31 without departing from the scope of the disclosure.

In the event that the fuel-related first updated flight parameter 52 is determined by the FMS 8 to not satisfy predetermined criteria 53 of the second flight plan 31, the method 300 can include determining with the FMS 8, fuel-related information, such as a first set of fuel-related information 43 or a second set of fuel-related information 49, or both at 340. The fuel-related information 43, 49 can be retrieved from a memory of the FMS 8, or the computer 13, calculated, or otherwise determined. In other non-limiting aspects, the fuel-related information 43, 49 can be provided to the FMS 8 by the destination server 34, the ATC 32, the airline management system 37, or combinations thereof, via the communication link 24. In non-limiting aspects, the fuel-related information 43, 49 can comprise any one or more of information related to fueling locations, fuel vendors, fuel service providers, fuel costs, re-fueling times, distance from the first destination, distance from the second departure location, distance from a current location of the aircraft 10, predetermined preferred fuel vendors, fuel ordering information, and the like, for each airport of a set of airports. In other aspects, the fuel-related information 43, 45 is not so limited, and the fuel-related information 43, 45 can comprise any desired fuel-related information without departing from the scope of the disclosure. For example, in non-limiting aspects, the determining fuel-related information 43, 45 can include, at 342, determining a set of refueling locations 44. In some non-limiting aspects, the determining fuel-related information 43, 45 can include, at 344, determining by the FMS 8, a distance to a refueling location. In still other non-limiting aspects, the determining additional fuel-related information can include, at 346, determining, by the FMS 8, a relative ranking of the refueling locations. Other aspects are not so limited, and the determining additional fuel-related information can include, without limitation, determining a quantity of fuel needed to satisfy a predetermined criteria 53 of the second flight plan 31 or enable the aircraft 10 to meet the predetermined criteria 53 to execute the second flight plan 31, determining a cost of fuel at each respective refueling location 44, respective potential time of arrival of the aircraft 10 at one or more of the determined refueling locations 44, determining a respective time required to refuel at each refueling location 44 or combinations thereof. In other non-limiting aspects, the additional information can comprise any desired additional information without departing from the scope of the disclosure. In non-limiting aspects, the determining fuel-related information 43, 45 can additionally or alternatively be based on a set of predetermined rules. For example, the set of refueling locations 44 can be determined based on a proximity to a destination airport or a proximity to a current location of the aircraft 10. In some aspects, the fuel-related information 43, 45 can further include preferences or weighting factors. For example, a predetermined weighting factor can be applied by the FMS 8 to favor refueling locations 44 having a lower cost of fuel, or a faster re-fueling time. The preferences or weighting factors can be applied by the FMS 8 to determine a relative ranking of the determined refueling locations 44. In other aspects, the set of predetermined rules and preferences can include any desired rule or preference without departing from the scope of the disclosure. In non-limiting aspects, the fuel-related information 43, 49 can comprise any one or more of predetermined information related to fueling locations, fuel vendors, fuel service providers, fuel costs, re-fueling times, distance from the first destination, distance from the second departure location, distance from a current location of the aircraft 10, predetermined preferred fuel vendors, fuel ordering information, and the like, for each airport of a set of airports. In other aspects, fuel-related information 43, 49 is not so limited, and can comprise any desired fuel-related information without departing from the scope of the disclosure.

Additionally, in the event that the fuel-related first updated flight parameter 52 is determined to not satisfy predetermined criteria 53 of the second flight plan 31, the method 300 can include, at 350, displaying, by the FMS 8, a first notification 61. The first notification 61 can include information displayed on the display device 60 indicative of the determination that the fuel-related first updated flight parameter 52 does not satisfy predetermined criteria 53 of the second flight plan 31.

The first notification 61 can comprise, for example, an indication to the pilot or flight crew of the determined refueling locations 44, at 352. For example, in non-limiting aspects, the first notification 61 can include a list, or other indication, of the set of refueling locations 44. In some aspects, the first notification 61 can include a dynamic display on the display device 60 to enable the pilot to iterate through a list such as a linked list or selectable menu of the set of refueling locations 44.

In non-limiting aspects, the displaying a first notification 61 can comprise displaying other information related to the refueling locations 44. For example, in non-limiting aspects, the displaying a first notification 61 can include displaying an indication of a respective distance (e.g., in hours or miles) of each refueling locations 44, at 354. In other in non-limiting aspects, the displaying a first notification 61 can include displaying an indication of a relative ranking of each refueling location 44, at 356. In still other non-limiting aspects, the displaying a first notification 61 can further include displaying the respective fuel cost or respective estimated time to refuel, or both, with respect to the determined refueling locations 44.

In other non-limiting aspects, the displaying a first notification 61 can further comprise displaying other fuel-related information such as, without limitation, the respective potential time of arrival by the aircraft 10 to the determined refueling locations 44, or displaying other information related to the determined refueling locations 44, such as fuel vendor names, fuel service provider names, fuel costs at each refueling location 44, re-fueling times at each refueling location 44, distance of each respective refueling location 44 from the first destination, distance of each respective refueling location 44 from the second departure location, predetermined preferred fuel vendors, fuel ordering information for each refueling location 44, and the like. In other aspects, the displaying a first notification 61 is not so limited, and the displaying a first notification 61 can comprise displaying any desired fuel-related information, without departing from the disclosure. It is further contemplated that in non-limiting aspects, the first notification 61 can include at 358, prompting the user (e.g., the pilot) to choose or select (e.g., input into the computer 13 or FMS 8) a particular refueling location 44 of the refueling locations 44.

The method 300 can include, at 358, receiving, by the FMS 8, a selection of a refueling location 44 in response to the first notification 61. In response to the selection of a particular refueling location 44, the method 300 can include at 391 automatically triggering a first message 71 by the FMS 8 to a predetermined recipient associated with the selected refueling location 44 to request a fuel service at the selected refueling location 44. For example, the first message 71 can be triggered by the FMS 8 and sent via the communication link 24 and the ATC 32 to the selected refueling location 44 to request or reserve a refueling service or transaction for the aircraft 10. In some aspects, the first message 71 can include a requested quantity of fuel and an estimated time of arrival of the aircraft 10 for refueling. The method 300 can further include, at 392, navigating the aircraft 10 to the selected refueling location 44, and, at 393, refueling the aircraft 10 at the selected refueling location prior to executing the second flight plan 31. The method 300 can also include, at 396, updating the second flight plan in the FMS 8 based on the refueling.

Regardless of the determination by the FMS 8 whether the fuel-related first updated flight parameter 52 will satisfy predetermined criteria 53 of the second flight plan 31, non-limiting aspects of the method 300 can also include at 370 additionally or alternatively determining by the FMS 8 whether the first update 27 is necessitated or accompanied by an identified need for an aviation service action to the aircraft 10 that must be performed prior to executing the second flight plan 31. For example, the aviation service action can include a repair to, maintenance, replacement, or inspection of, equipment onboard the aircraft 10. In non-limiting aspects, the determining whether the first update 27 is necessitated or accompanied by a need for an aviation service action to the aircraft 10 that must be performed prior to executing the second flight plan 31 can be made in-flight (i.e., during execution of the first flight plan 21). In some non-limiting aspects, the determining whether the first update 27 is accompanied by an identified need for an aviation service action to the aircraft 10 that must be performed prior to executing the second flight plan 31 can be based on the particular indicated need for an aviation service action. For example, in some aspects, the determining whether the first update 27 is necessitated or accompanied by an identified need for an aviation service action to the aircraft 10 that must be performed prior to executing the second flight plan 31 can include determining whether the needed aviation service would result in an inability to dispatch (e.g., receive a "no go" indication for a subsequent take-off, unless the aviation service is completed) after landing or otherwise ending the first flight plan 21. In aspects, such a determination can be based on predetermined rules, such as conventional MEL rules. For example, in non-limiting aspects, the FMS 8 can be configured to determine that an indicated need for service to equipment onboard the aircraft 10 would result in an inability to dispatch on a subsequent flight plan 31, based on a predetermined MEL for the aircraft 10. Regardless of the reason or basis of the determination of the need for aviation service In non-limited aspects, an indication of the need for an aviation service action can be manually entered into the FMS 8 (e.g., by a pilot), or automatically provided by the computer 13 or an external source (e.g. EFB 25, or the ATC 32). In the event of a determination by the FMS 8 of a need for an aviation service to be performed prior to executing the second flight plan 31, the method 300 can include at 372 determining, with the FMS 8, additional aviation service-related information 45. The additional aviation service-related information 45 can be stored in a memory of the FMS, or the computer 13. In other non-limiting aspects, the additional aviation service-related information 45 can be provided to the FMS 8 by the destination server 34, the ATC 32, the airline management system 37, or combinations thereof, via the communication link 24.

The determining additional aviation service-related information can include at 374, determining a set of aviation service locations 46. In other non-limiting aspects, the determining additional aviation service-related information 45 can include, at 376, determining a distance to an aviation service location 46. In still other non-limiting aspects, the determining additional fuel-related information can include, at 348, determining a relative ranking of the aviation service location 46. Other aspects are not so limited, and the determining additional aviation service-related information can include, without limitation, any one or more of predetermined information related to aviation service locations, aviation service vendors, aviation service costs, aviation service times, distance of the aviation service locations from the first destination, distance of the aviation service locations from the second departure location, predetermined aviation service providers, parts and service ordering, and the like, for each airport of a set of airports. In other aspects, the determining aviation service related information 45 is not so limited, and the determining aviation service related information 45 can comprise determining any desired aviation service-related information without departing from the scope of the disclosure.

In the event that a need for an aviation service action is determined by the FMS 8, the method 300 can include displaying, by the FMS 8, a second notification 62. For example, the displaying a second notification 62 can notify the pilot or flight crew of the determination via the display device 60. The displaying a second notification 62 can include displaying information indicative of the need for an aviation service action to the aircraft 10 that must be performed prior to executing the second flight plan 31.

In non-limiting aspects, the displaying a second notification 62 can comprise displaying other information related to the aviation service locations 46. For example, the displaying a second notification 62 can include displaying a list or other indication of aviation service locations at 384. In some aspects, the displaying a second notification 62 can include a dynamic display on the display device 60 to enable the pilot to iterate through a list, such as a linked list or selectable menu, of the set of aviation service locations 46.

In non-limiting aspects, the displaying a second notification 62 can include displaying an indication of a respective distance (e.g., in hours or miles) of each aviation service location 46, at 386. In other in non-limiting aspects, the displaying a second notification 62 can include displaying an indication of a relative ranking of each aviation service location 46, at 388. In still other non-limiting aspects, the displaying a second notification 62 can further include displaying a respective aviation service cost or respective estimated time to perform the aviation service action, or both, with respect to the determined aviation service locations 46.

In non-limiting aspects, the displaying a second notification 62 can comprise displaying other information related to the aviation service locations 46. For example, in non-limiting aspects, the displaying a second notification 62 can comprise displaying at least one of a respective service cost (e.g. a monetary cost) and a respective estimated time to complete the service at each determined aviation service location 46. In other non-limiting aspects, the displaying a second notification 62 can comprise displaying a respective time of arrival at one or more of the determined aviation service locations 46. In such aspects, the displaying a second notification 62 can comprise displaying the respective time of arrival by the aircraft 10 to the determined aviation service locations 46.

In non-limiting aspects, the displaying a second notification 62 can comprise displaying still other information related to the aviation service locations 46, such as aviation service vendor names, aviation service costs at each respective aviation service location 46, servicing times at each aviation service location 46, distance of each respective aviation service location 46 from the first destination, distance of each respective aviation service location 46 from the second departure location, distance of each respective aviation service location 46 from the current location of the aircraft 10, predetermined preferred aviation service vendors, aviation service ordering information for each aviation service location 46, and the like. In other aspects, the displaying a second notification 62 is not so limited, and the displaying a second notification 62 can comprise displaying any desired aviation service related information without departing from the scope of the disclosure.

It is further contemplated that in non-limiting aspects, the displaying a second notification 62 can include, at 388, prompting the user (e.g., the pilot) to choose or select (e.g., input into the computer 13 or FMS 8) a particular aviation service location 46. In non-limiting aspects the method 300 can include receiving a selection of an aviation service location 46 at 389. In response to a receiving a selection by a user at 389, of a particular aviation service location 466, method 300 can include at 392 automatically triggering, by the FMS 8, a second message 72. In aspects, the second message 72 can be provided or conveyed to by the FMS 8 to a predetermined recipient associated with the selected aviation service location 46. In aspects, the second message 72 can request an aviation service action at the selected aviation service location 46. For example, the second message 72 can be sent from the FMS 8 via the communication link 24 and the ATC 32 to the selected aviation service location 46 to request or reserve an aviation service action or transaction for the aircraft 10. In some aspects, the second message 72 can include a requested aviation service action and an estimated time of arrival of the aircraft 10 for service.

In the event that the fuel-related first updated flight parameter 52 is determined by the FMS 8 to satisfy predetermined criteria 53 of the second flight plan 31, the method 300 can include at 330, displaying, by the FMS 8, a third notification 63. The third notification 63 can include information displayed on a display device 60 in the cockpit 16 of the aircraft 10 to notify the pilot or flight crew of the determination that the fuel-related first flight parameter 52 will not enable the aircraft 10 to satisfy predetermined criteria 53 of the second flight plan 31.

Aspects as described herein can determine updated fuel-related first flight parameters based an update to a first flight plan, predict a fuel-related parameter based on executing the first updated flight plan in accordance with the update, and determine, for a second flight plan whether the predicted or determined fuel-related parameter will enable the aircraft 10 to meet predetermined criteria to execute the second flight plan. In this way aspects as described herein can thereby identify refueling needs in advance, and enable better planning and scheduling for re-fueling and aviation service actions.

The sequences depicted are for illustrative purposes only and is not meant to limit the method 300 in any way as it is understood that the portions of the method can proceed in a different logical order, additional or intervening portions can be included, or described portions of the method can be divided into multiple portions, or described portions of the methods can be omitted without detracting from the described method. For example, the methods 300 can include various other intervening steps. The examples provided herein are meant to be non-limiting.

It is further contemplated that aspects of this disclosure can advantageously increase pilot efficiency despite changes or updates to flight plans, thereby increasing the amount of available time for the pilot to address other matters. Specifically, conventional updating methods can require the pilot or the flight crew manually update the flight plan and determine whether the changes impact refueling with respect to another subsequent flight. This can be very time consuming and take the flight crew or the pilot away from other tasks that need to be performed to operate the aircraft. The method disclosed herein, however, does not require intensive manual interactions from the flight crew or the pilot This is particularly advantageous in the case of Single Pilot Operations (SPO) or Reduced Crew Operations (RCO). It is further contemplated that aspects of this disclosure can increase aviation efficiency by enabling scheduling of re-fueling and aviation service while in-flight, based on changes to a flight plan.

To the extent not already described, the different features and structures of the various embodiments can be used in combination with each other as desired. That one feature is not illustrated in all of the embodiments is not meant to be construed that it may not be included, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

A method for updating a flight plan by an avionics device for an aircraft, the method comprising: receiving a first flight plan for a first flight comprising a first set of flight parameters having at least one fuel-related first flight parameter; receiving a second flight plan for a subsequent second flight, the second flight plan based on a fuel remaining in the aircraft without refueling subsequent to the first flight; receiving an update to the first flight plan; determining, based on the update to the first flight plan, a set of first updated flight parameters comprising at least one fuel-related first updated flight parameter; determining, whether the fuel-related first updated flight parameter will satisfy predetermined criteria of a second flight plan; and when the fuel-related first updated flight parameter will not satisfy the predetermined criteria automatically displaying a first notification onboard the aircraft; receiving a selection of a refueling location based on the notification; and navigating the aircraft to the selected refueling location.

The method of any preceding clause, further comprising navigating the aircraft to the selected refueling location.

The method of any preceding clause, further comprising refueling the aircraft prior to executing the second flight plan.

The method of any preceding clause, further comprising updating the second flight plan based on the refueling.

The method of any preceding clause, further comprising, when the fuel-related first updated flight parameter will not satisfy the predetermined criteria, determining a set of refueling locations; and wherein the first notification includes an indication of the set of refueling locations.

The method of any preceding clause, further comprising determining a relative ranking of each refueling location with respect to the other refueling locations; and wherein the first notification includes an indication of the relative ranking of each refueling location with respect to the other refueling locations.

The method of any preceding clause, wherein the first notification includes a prompt to a user to select a refueling location.

The method of any preceding clause, further comprising automatically triggering a first message to a selected refueling location.

The method of any preceding clause, wherein the update to the first flight plan is based on a determined need for an aviation service to equipment onboard the aircraft.

The method of any preceding clause, further including automatically displaying a second notification onboard the aircraft indicative of the determined need for an aviation service to equipment onboard the aircraft.

The method of any preceding clause, further comprising determining a set of aviation service locations; and wherein the second notification includes an indication of the set of aviation service locations.

The method of any preceding clause, wherein the second notification includes a prompt to a user to select an aviation service location.

The method of any preceding clause, further comprising automatically triggering a second message to a selected aviation service location to request an aviation service action to equipment onboard the aircraft.

A system for an aircraft, comprising: an avionics device adapted to update a first flight plan, and configured to: store a first flight plan for a first flight comprising a first set of flight parameters having at least one fuel-related first flight parameter; store a second flight plan for a subsequent second flight, the second flight plan based on a fuel remaining in the aircraft without refueling subsequent to the first flight; receive an update to a first flight plan, the first flight plan comprising a first set of flight parameters having at least one fuel-related first flight parameter; determine, based on the update to the first flight plan, a set of first updated flight parameters comprising at least one fuel-related first updated flight parameter; determine, for a second flight plan, whether the fuel-related first updated flight parameter will satisfy predetermined criteria of the second flight plan; and when the fuel-related first updated flight parameter will not satisfy the predetermined criteria, automatically display a first notification onboard the aircraft; and receive a selection of a refueling location.

The system of any preceding clause, wherein the avionics device is further configured to determine a set of refueling locations when the fuel-related first updated flight parameter will not satisfy the predetermined criteria; and indicate the set of refueling locations in the first notification.

The system of any preceding clause, wherein the avionics device is further configured to determine, based on predetermined criteria, a relative ranking of each determined refueling location with respect to the other refueling locations; and indicate in the first notification the relative ranking of each refueling location with respect to the other refueling locations.

The system of any preceding clause, wherein the first notification further includes a prompt to a user to select a refueling location of the set of refueling locations.

The system of any preceding clause, wherein the avionics device is further configured to automatically trigger a message to a selected one of the refueling locations to request fuel.

The system of any preceding clause, wherein the update to the first flight plan is based on a determined need for an aviation service to the aircraft.

The system of any preceding clause, wherein the avionics device is further configured to automatically trigger a second notification to display onboard the aircraft indicative of determined need for an aviation service to the aircraft.

The system of any preceding clause, wherein the second notification further includes an indication of a set of aviation service locations.

What is claimed is:

1. A method for updating a flight plan by an avionics device for an aircraft, the method comprising:

receiving a first flight plan for a first flight comprising a first set of flight parameters having at least one fuel-related first flight parameter;

receiving a second flight plan for a subsequent second flight, the second flight plan based on a fuel remaining in the aircraft without refueling subsequent to the first flight;

receiving an update to the first flight plan;1s= determining, based on the update to the first flight plan, a set of first updated flight parameters comprising at least one fuel-related first updated flight parameter;

determining, whether the fuel-related first updated flight parameter will satisfy predetermined criteria of the second flight plan; and when the fuel-related first updated flight parameter will not satisfy the predetermined criteria, automatically displaying a first notification onboard the aircraft; and receiving a selection of a refueling location based on the first notification, wherein the update to the first flight plan is based on a determined need for an aviation service to equipment onboard the aircraft.

2. The method of claim 1, further comprising navigating the aircraft to the selected refueling location.

3. The method of claim 1, further comprising refueling the aircraft prior to executing the second flight plan.

4. The method of claim 3, further comprising updating the second flight plan based on the refueling.

5. The method of claim 1, further comprising, when the fuel-related first updated flight parameter will not satisfy the predetermined criteria, determining a set of refueling locations; and wherein the first notification includes an indication of the set of refueling locations.

6. The method of claim 5, further comprising determining a relative ranking of each refueling location with respect to the other refueling locations; and wherein the first notification includes an indication of the relative ranking of each refueling location with respect to the other refueling locations.

7. The method of claim 5, wherein the first notification includes a prompt to a user to select a refueling location.

8. The method of claim 7, further comprising automatically triggering a first message to a selected refueling location.

9. The method of claim 1, further including automatically displaying a second notification onboard the aircraft indicative of the determined need for an aviation service to equipment onboard the aircraft.

10. The method of claim 9, further comprising determining a set of aviation service locations; and wherein the second notification includes an indication of the set of aviation service locations.

11. The method of claim 10, wherein the second notification includes a prompt to a user to select an aviation service location.

12. The method of claim 11, further comprising automatically triggering a second message to a selected aviation service location to request an aviation service action to equipment onboard the aircraft.

13. A system for an aircraft, comprising:

an avionics device adapted to update a first flight plan, and configured to:

store a first flight plan for a first flight comprising a first set of flight parameters having at least one fuel-related first flight parameter;

store a second flight plan for a subsequent second flight, the second flight plan based on a fuel remaining in the aircraft without refueling subsequent to the first flight;

receive an update to the first flight plan wherein the update to the first flight plan is based on a determined need for an aviation service to equipment onboard the aircraft;

determine, based on the update to the first flight plan, a set of first updated flight parameters comprising at least one fuel-related first updated flight parameter;

determine, for the second flight plan, whether the fuel-related first updated flight parameter will satisfy predetermined criteria of the second flight plan; and when the fuel-related first updated flight parameter will not satisfy the predetermined criteria, automatically display a first notification onboard the aircraft; and receive a selection of a refueling location.

14. The system of claim 13, wherein the avionics device is further configured to determine a set of refueling locations when the fuel-related first updated flight parameter will not satisfy the predetermined criteria; and indicate the set of refueling locations in the first notification.

15. The system of claim 14, wherein the avionics device is further configured to determine, based on predetermined criteria, a relative ranking of each determined refueling location with respect to the other refueling locations; and indicate in the first notification the relative ranking of each refueling location with respect to the other refueling locations.

16. The system of claim 14, wherein the avionics device is further configured to automatically trigger a first message to a selected one of the refueling locations to request fuel.

17. The system of claim 13, wherein the avionics device is further configured to automatically trigger a second notification to display onboard the aircraft indicative of determined need for an aviation service to the aircraft.

18. The system of claim 17, wherein the second notification further includes an indication of a set of aviation service locations.

* * * * *